Nov. 3, 1942.  F. L. BRONSON  2,300,906
METHOD AND APPARATUS FOR MAKING FIBROUS CONTAINERS
Filed Oct. 11, 1939  11 Sheets-Sheet 4
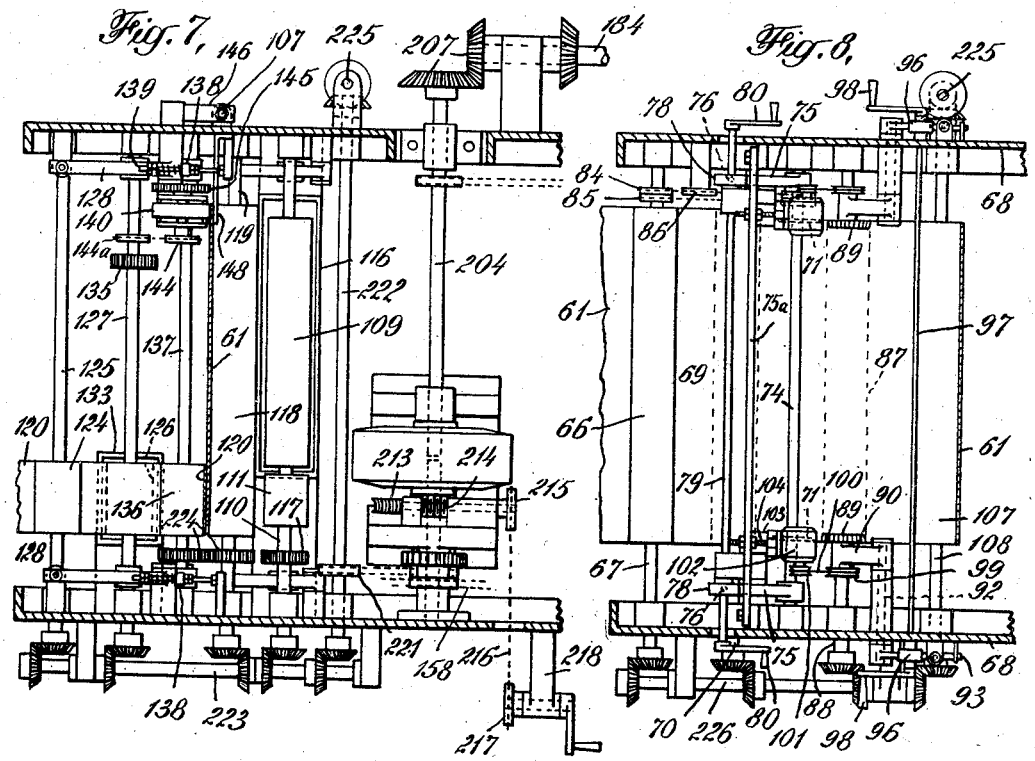
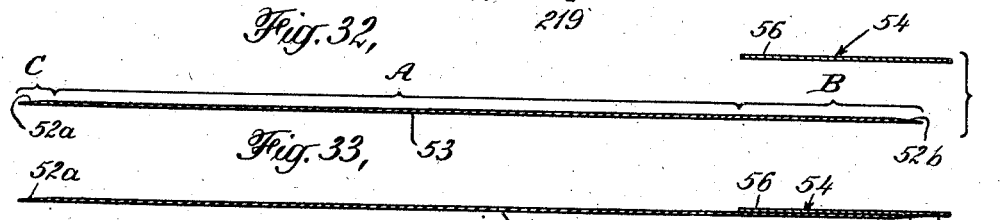
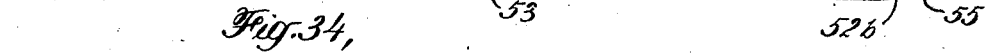
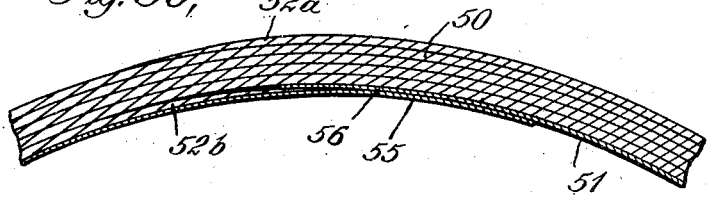
INVENTOR
FREDERICK L. BRONSON
BY
Pennie, Davis, Marvin & Edmonds
ATTORNEYS

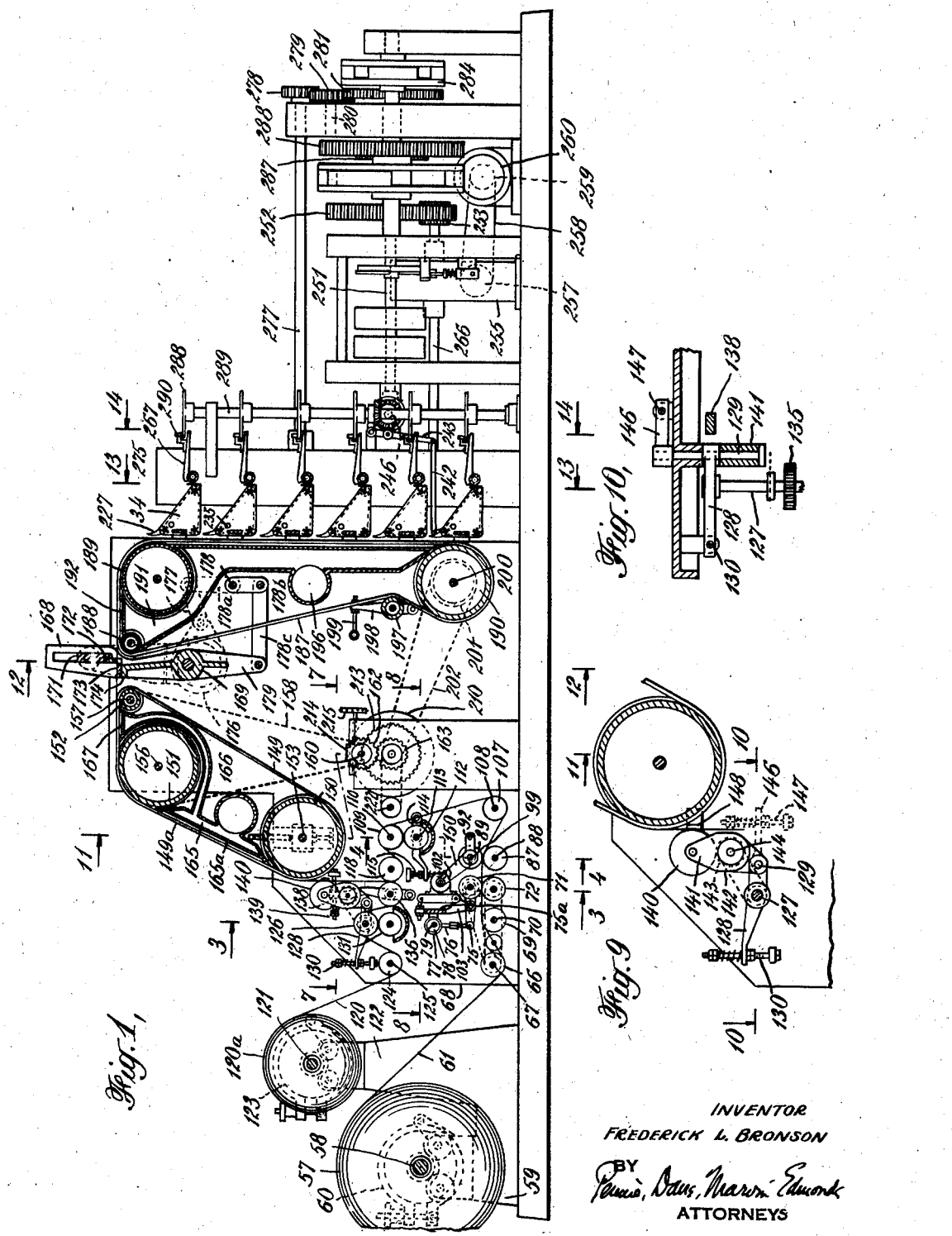

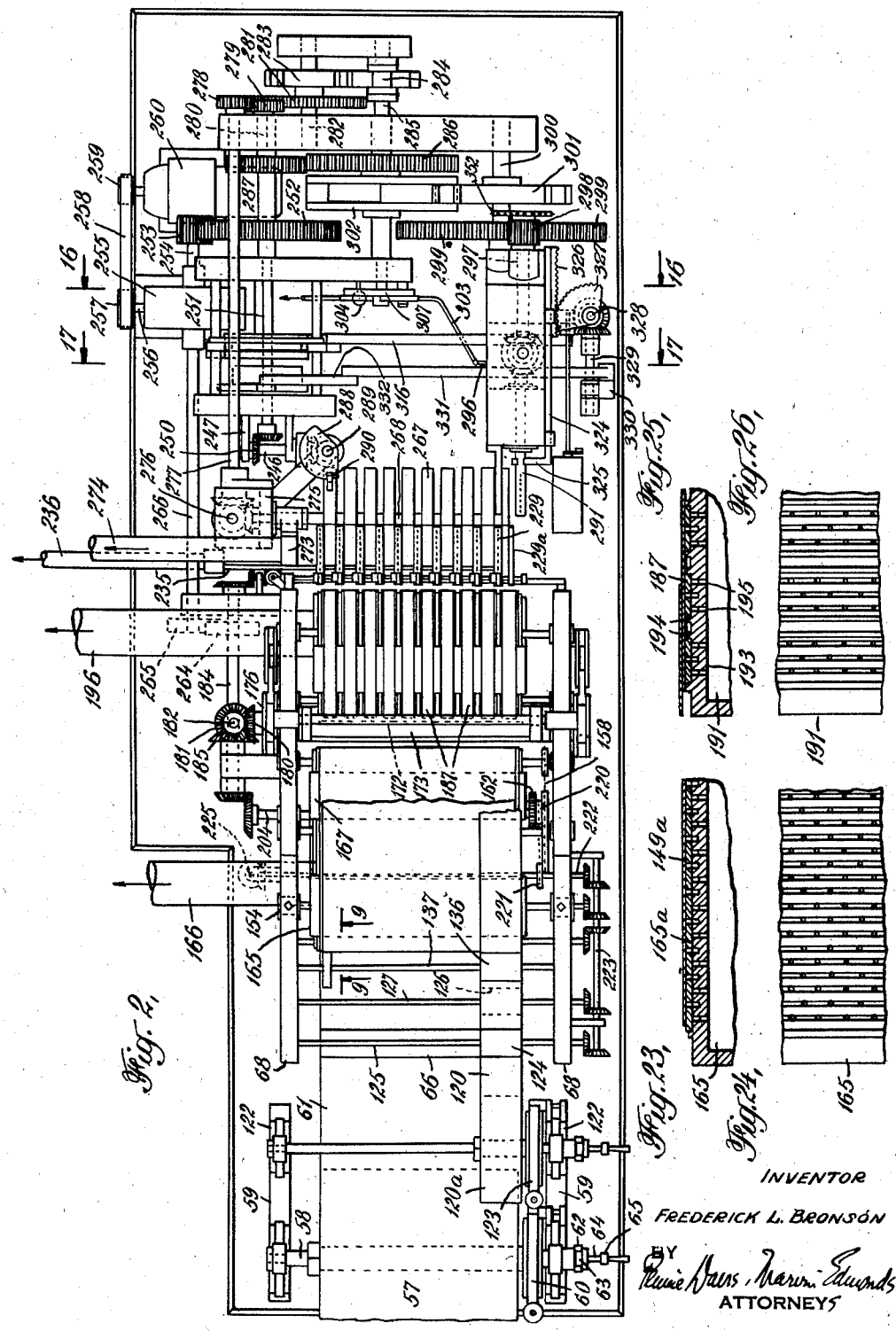

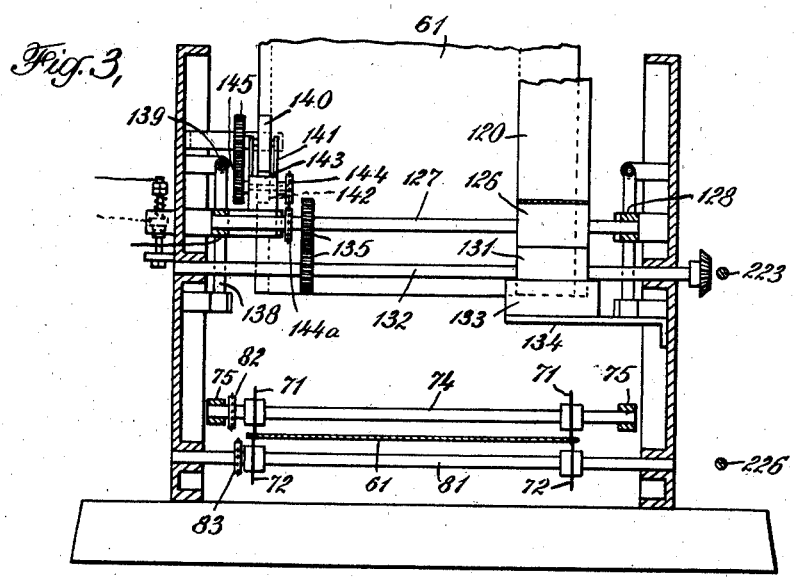
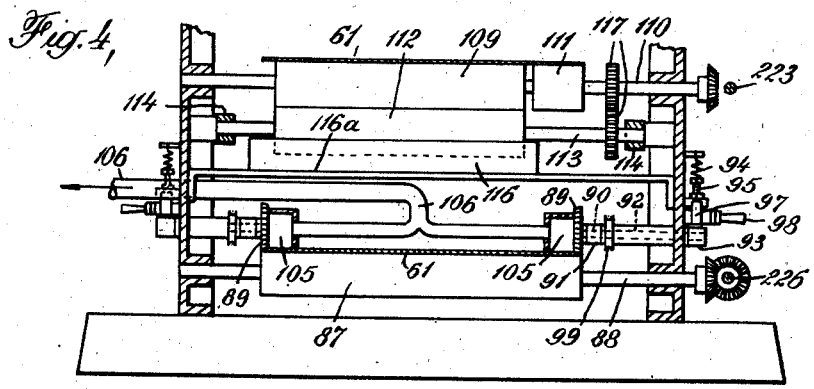
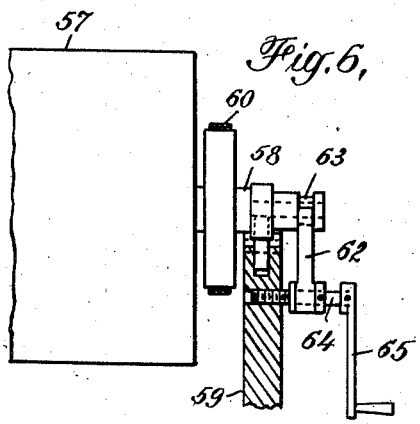
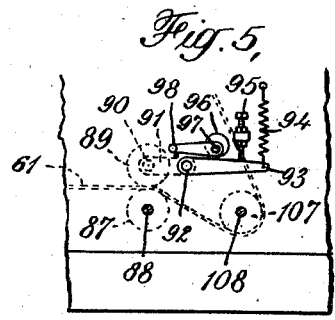

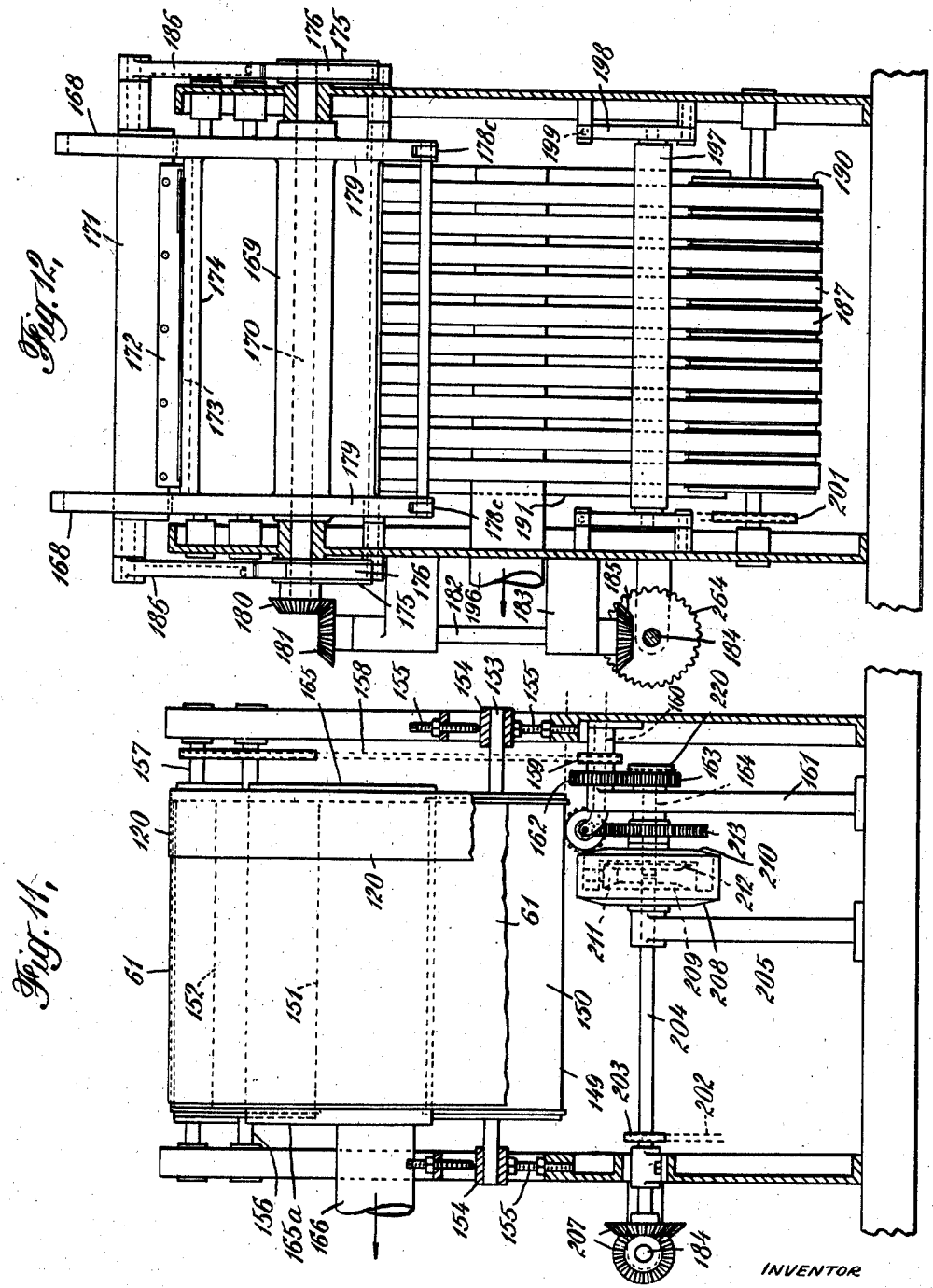

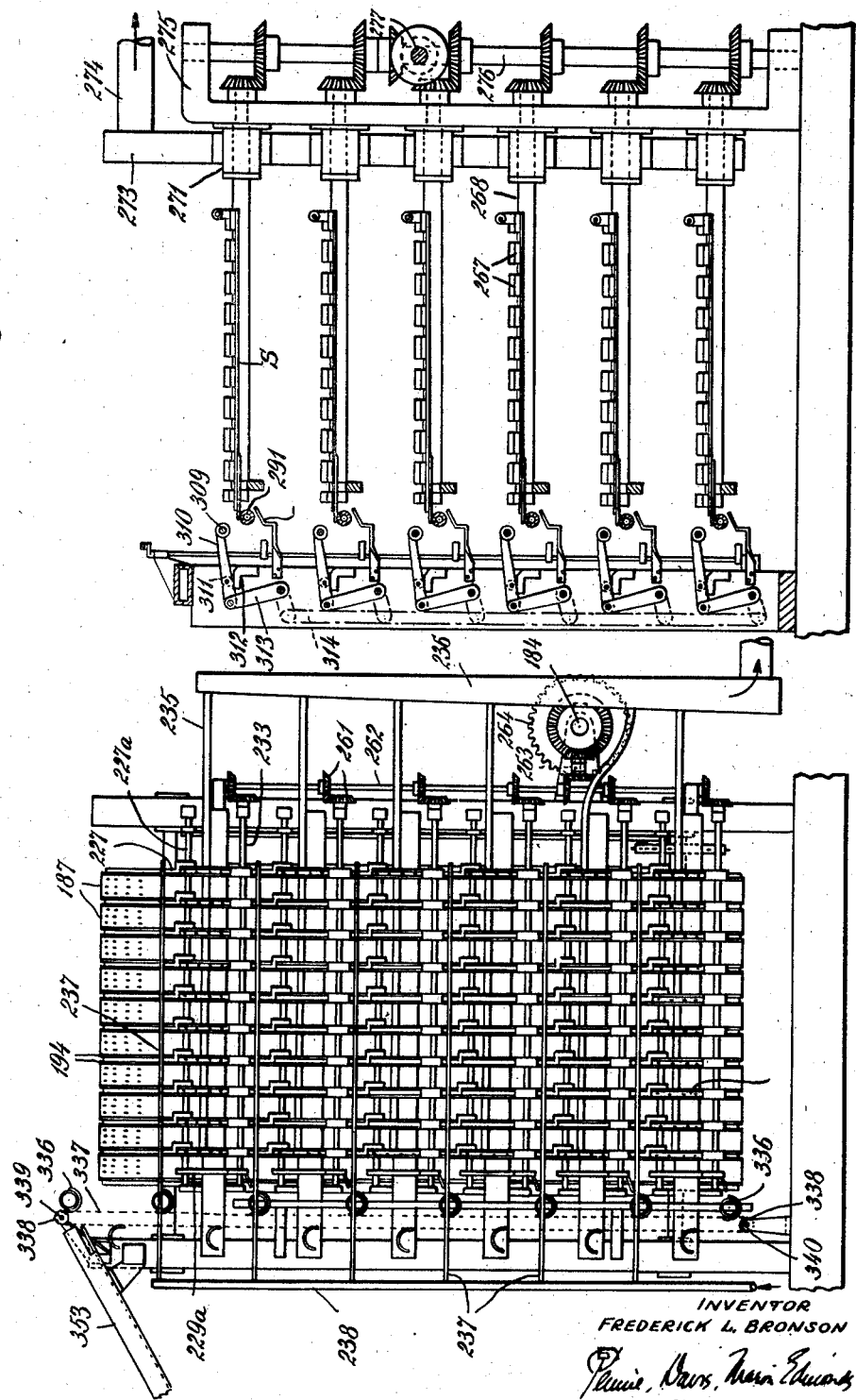

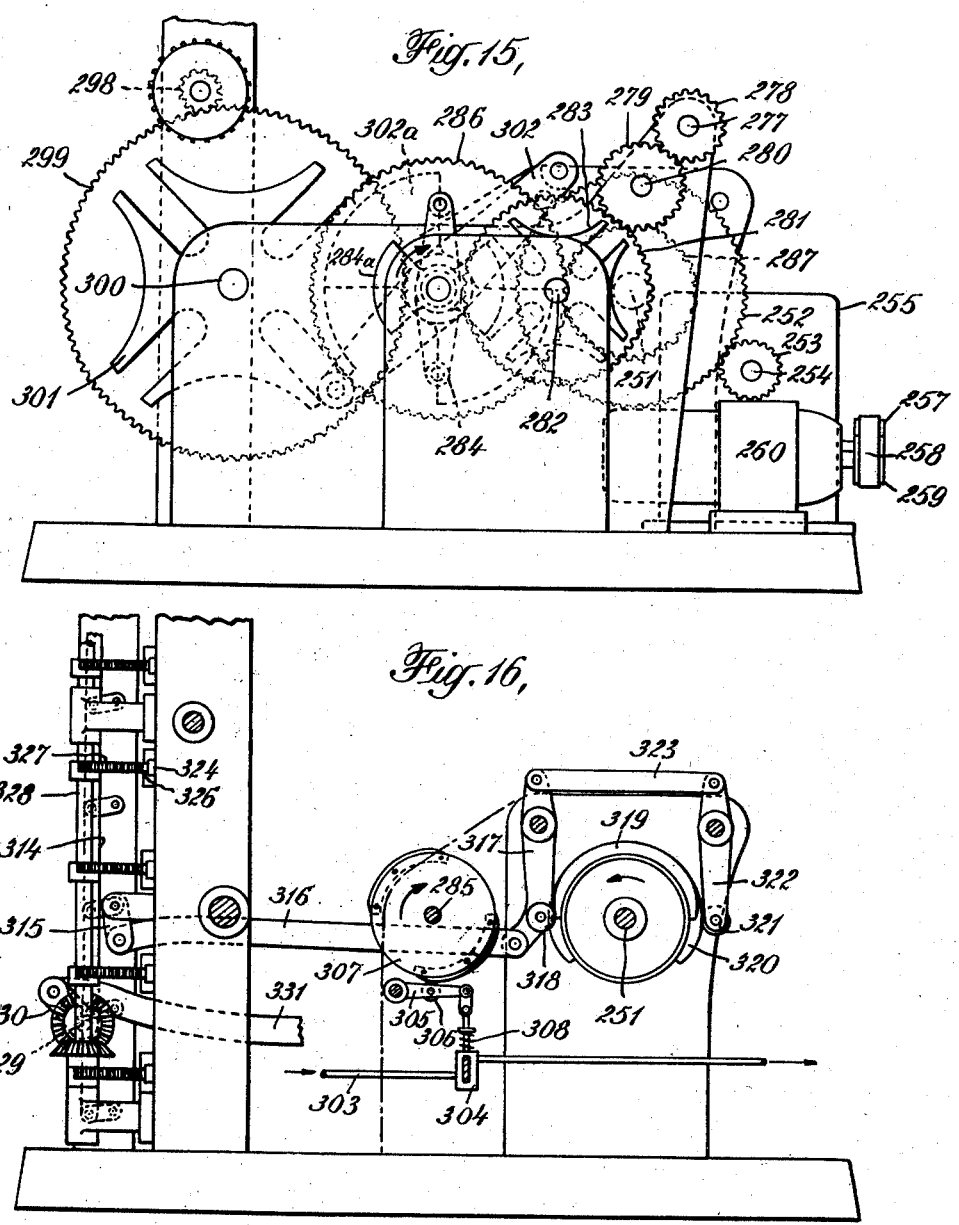

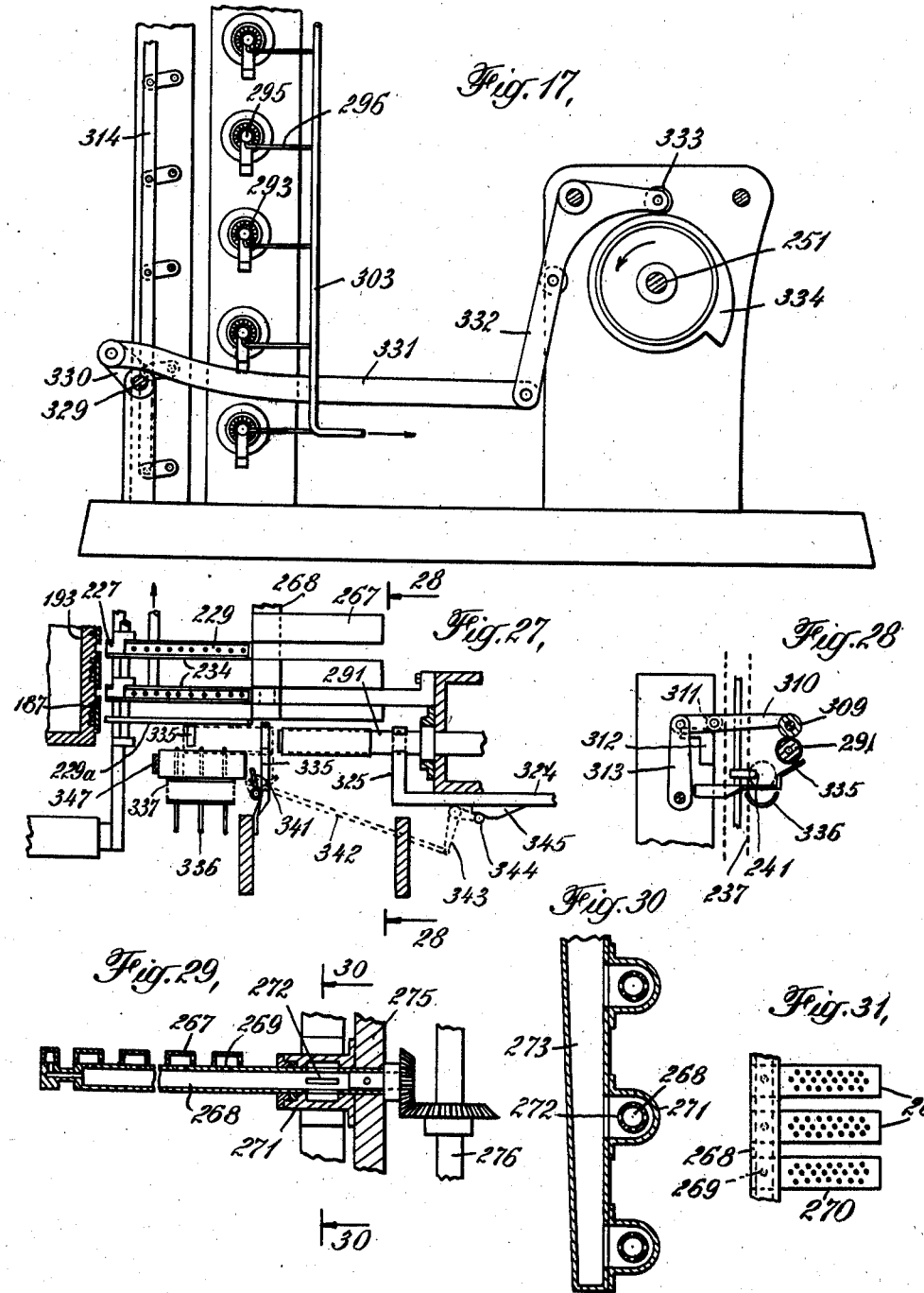

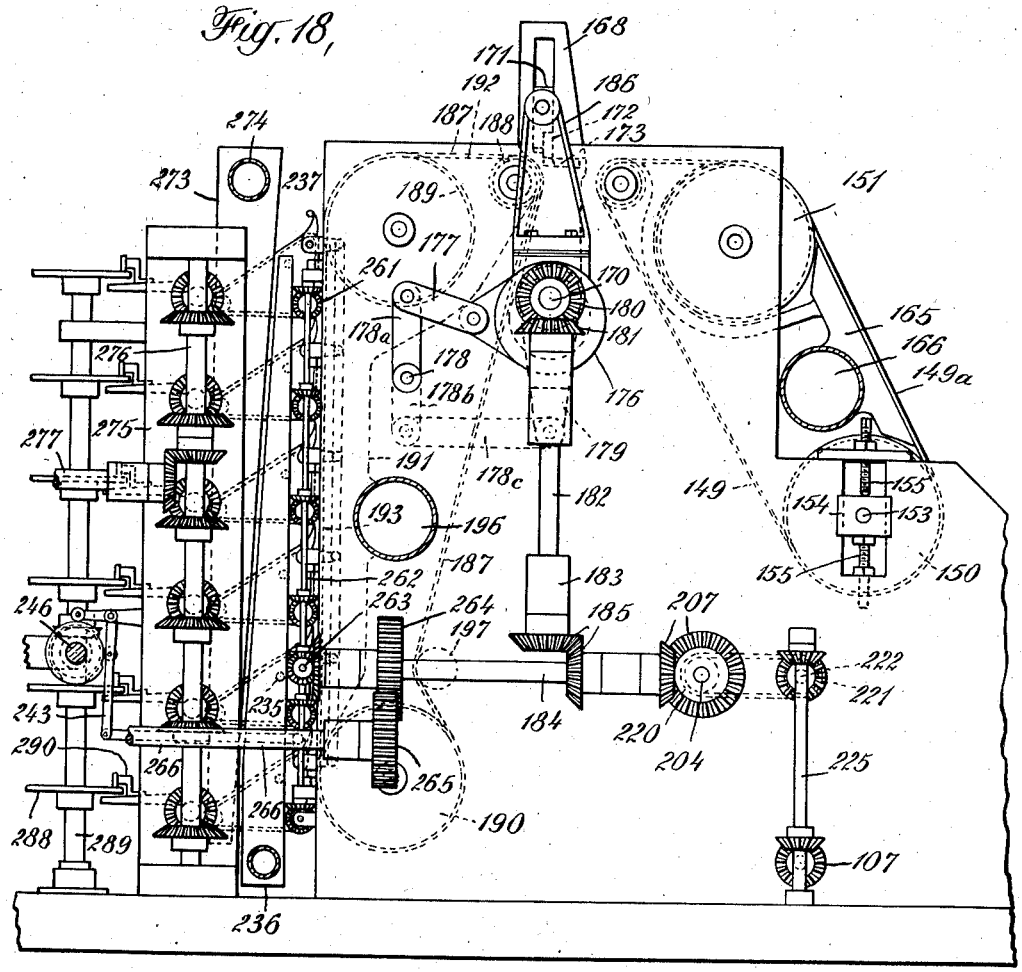

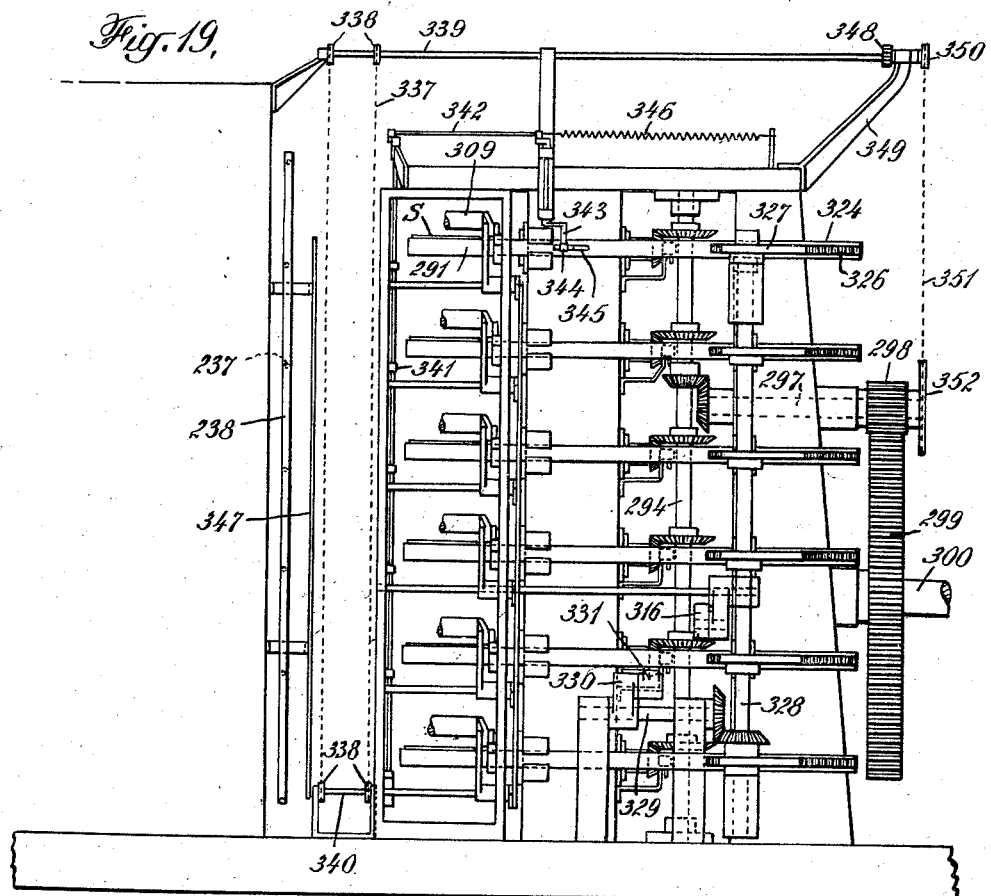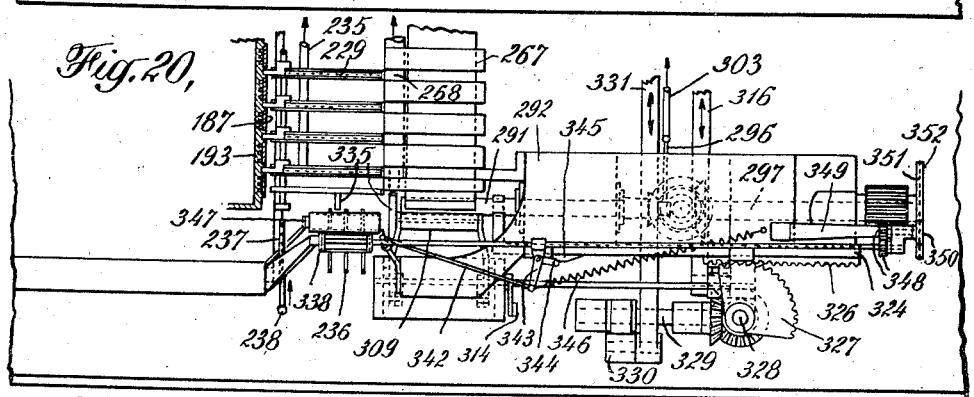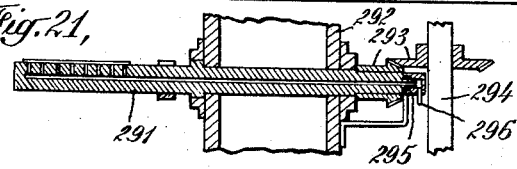

Nov. 3, 1942.   F. L. BRONSON   2,300,906
METHOD AND APPARATUS FOR MAKING FIBROUS CONTAINERS
Filed Oct. 11, 1939   11 Sheets-Sheet 11
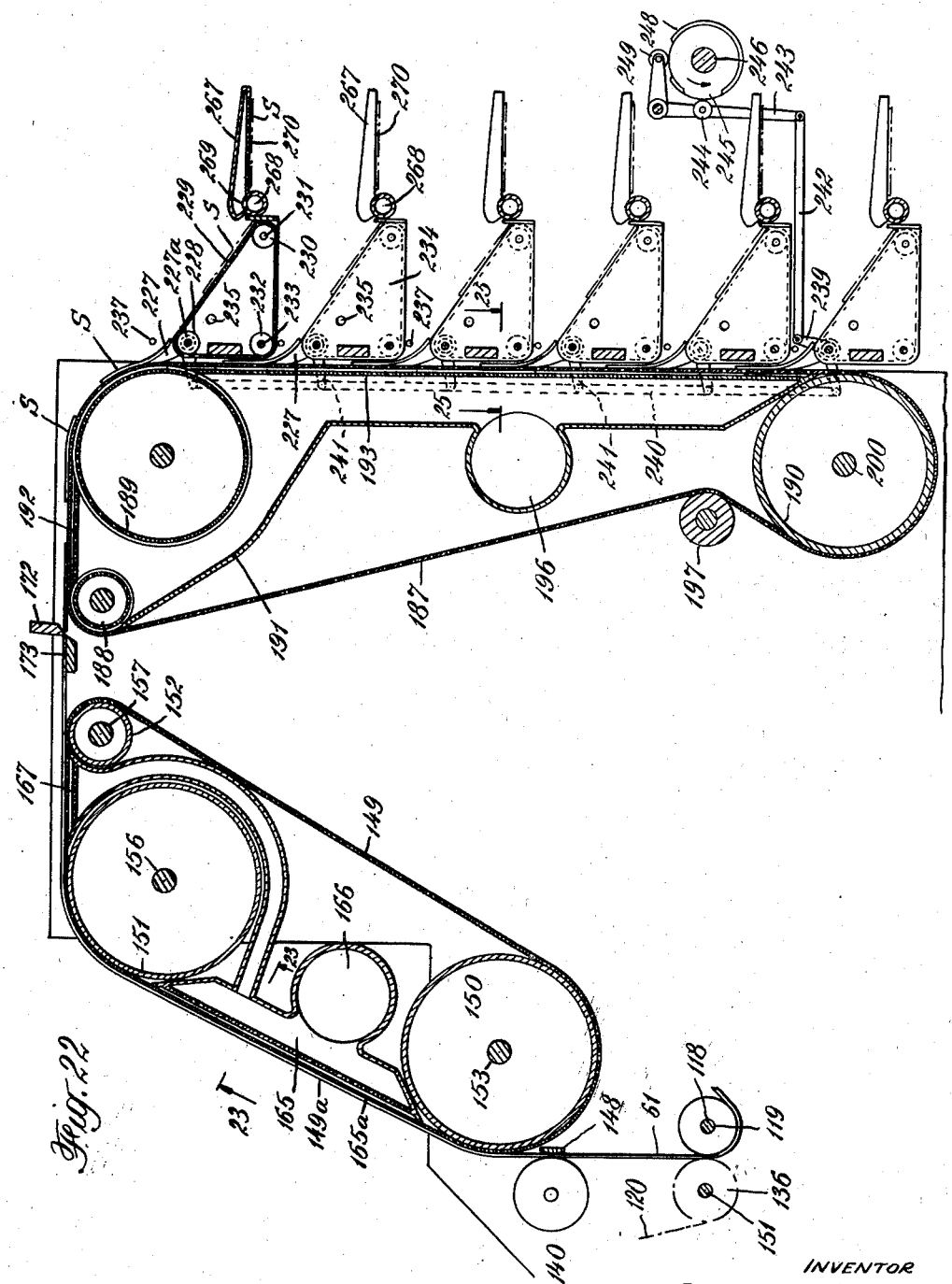
INVENTOR
FREDERICK L. BRONSON
BY
ATTORNEYS Patented Nov. 3, 1942

2,300,906

UNITED STATES PATENT OFFICE 2,300,906

METHOD AND APPARATUS FOR MAKING FIBROUS CONTAINERS

Frederick L. Bronson, New York, N. Y., assignor to The Fibre Can and Machinery Company, New Haven, Conn., a corporation of Connecticut Application October 11, 1939, Serial No. 298,974

35 Claims. (Cl. 93—81)

This invention relates to the manufacture of containers which consist of a body formed of laminations of fibrous material, such as paper of a suitable grade, and end closures, which frequently take the form of metal caps crimped or otherwise secured in place. More particularly, the invention is concerned with the provision of a novel method and apparatus for producing bodies for such containers by convolutely winding strips prepared in preliminary operations.

The new method and apparatus may be utilized in the production of wound container bodies of various types and are especially adapted for the manufacture of bodies for the containers disclosed in my co-pending application, Serial No. 170,525, filed October 23, 1937. An embodiment of the principles of the invention suitable for making the container bodies of that application will, accordingly, be illustrated and described for purposes of explanation, although it is to be understood that the utility of the invention is not restricted to the production of wound containers of any particular type.

The container disclosed in my co-pending application was devised to be capable for use in the distribution of oily liquids, such as petroleum lubricating oils, and it consists of a convolutely wound cylindrical body and sheet metal end caps crimped thereon. The body is composed mainly of laminations of kraft paper, in which the grain runs lengthwise of the container, and an inner convolution or liner of paper, such as glassine, which is impervious to oil and water. The container body has a wall which is of substantially uniform thickness throughout its circumference and is flexible, so that the body will yield when subjected to blows, instead of fracturing. In order to give the wall these qualities and at the same time make it leak-proof, adhesives of proper characteristics are employed in such manner that within the convolutions of the body, there is a complete circumferential barrier of adhesive which is oil-impervious, flexible, and non-brittle or gummy. This barrier is preferably provided by the adhesive between the liner and the kraft paper, and the convolutions of the kraft may then be affixed to one another by an adhesive lacking the specified qualities but lower in cost. Preferably, the outer end of the kraft is secured to the underlying convolution by an adhesive which is impervious to oil and water, flexible, and gummy, and retains those characteristics indefinitely. If desired, an adhesive of that type may be used throughout the container wall, when the added cost is not important.

The method and apparatus of the present invention make possible the rapid and efficient production of container bodies, such as those described in the co-pending application, as well as others. In the practice of the invention in the production of the container bodies of the application, webs of body and lining material are affixed together to form a composite web of indefinite length which is coated with adhesives of the desired type or types on the appropriate areas. The composite web is then cut into strips, each suitable for winding into a single body, and the strips are convolutely wound on mandrels. By the use of the new apparatus, all of the operations, beginning with the combining of the webs and ending with the stripping of the completed bodies from the mandrels, are carried on automatically and at high speed, so that the cost of manufacturing the bodies is low and the containers made therefrom afford substantial savings over prior containers, such as those of sheet metal.

For a better understanding of the invention, reference may be had to the accompanying drawings illustrating one form of apparatus embodying the principles of the invention and suitable for the practice of the new method. In these drawings:

Fig. 1 is a vertical longitudinal section of the machine with certain parts shown in elevation;

Fig. 2 is a plan view of the apparatus of Fig. 1 with certain parts broken away and others omitted;

Figs. 3 and 4 are sectional views on the lines 3—3 and 4—4, respectively, of Fig. 1;

Fig. 5 is a fragmentary view in elevation showing a detail of the mechanism for manipulating the bevelling device;

Fig. 6 is a fragmentary view partly in elevation and partly in section of means for shifting the main web roll endwise;

Figs. 7 and 8 are sectional views on the lines 7—7 and 8—8, respectively, of Fig. 1;

Fig. 9 is a sectional view on the line 9—9 of Fig. 2;

Fig. 10 is a sectional view on the line 10—10 of Fig. 9;

Figs. 11, 12, 13, and 14 are sectional views on the lines 11—11, 12—12, 13—13, and 14—14, respectively, of Fig. 1;

Fig. 15 is an end view of the driving mechanism of the machine taken at right angles and from the right of Fig. 1;

Figs. 16 and 17 are sectional views on the lines 16—16 and 17—17, respectively, of Fig. 2;

Fig. 18 is a fragmentary elevational view taken from the rear of Fig. 1;

Fig. 19 is a fragmentary elevational view of the strip winding mechanism;

Fig. 20 is a partial plan view of certain parts of the mechanism illustrated in Fig. 22;

Fig. 21 is a longitudinal sectional view through one of the winding mandrels illustrated in Fig. 20;

Fig. 22 is a longitudinal sectional view on an enlarged scale of the severing and strip handling mechanism shown in Fig. 1;

Fig. 23 is a sectional view on the line 23—23 of Fig. 22;

Fig. 24 is a fragmentary elevational view of that part of the mechanism of which Fig. 23 is a section;

Fig. 25 is a sectional view on the line 25—25 of Fig. 22;

Fig. 26 is an elevational view of that part of the mechanism of which Fig. 25 is a section;

Fig. 27 is a fragmentary plan view, partly in section, showing details of the body ejecting mechanism;

Fig. 28 is a sectional view on the line 28—28 of Fig. 27;

Fig. 29 is a longitudinal sectional view through one of the transfer fingers;

Fig. 30 is a sectional view on the line 30—30 of Fig. 29;

Fig. 31 is a bottom plan view on certain of the fingers shown in Fig. 27;

Fig. 32 is an end view of the parts of the composite web in disassembled relation;

Fig. 33 is a view similar to Fig. 32 showing the parts of the web in assembled relation;

Fig. 34 is a view similar to Fig. 33 illustrating the manner in which the winding operation is initiated; and Fig. 35 is a sectional view through a portion of the wall of a container constructed in accordance with the disclosure of my co-pending application.

The apparatus illustrated in the drawings is arranged for the production of container bodies of cylindrical form and having a wall formed of a number of convolutions of kraft paper and an inner convolution or liner of a different material, such as glassine. As illustrated in Fig. 35, the wall of the container comprises five complete laminations 50 of kraft paper and a complete liner convolution 51. In order that the wall may be of substantially uniform thickness throughout, the ends of the kraft strip are bevelled, as indicated at 52a, 52b, and the strip is of such length with relation to the circumference of the completed body that the bevelled edges lie in registry. The ends of the liner 51 have a considerable overlap, but this material is so thin that the overlap does not produce shoulders along which the contents of the container can leak past the end caps which are crimped on the ends of the body. To prevent the crimped edges of the caps from splitting the kraft paper, the strip, of which the body is wound is cut transversely of the web so that the grain of the paper runs from end to end of the container, and the crimped edges lie across rather than with the grain.

In the production of the container by the process of the present invention, a web 53 of kraft paper is drawn from a roll of appropriate width and the edges are then trimmed so that the width of the web is exactly the length of the strip to be used in winding the container body. The edges of the web are then bevelled at 52a, 52b, as previously described, and a coating of adhesive is applied over an area terminating inward from the edges of the web and indicated by the bracket A, Fig. 32. To reduce the cost, this adhesive is not gummy and non-brittle, but it is applied in a thin film which does not impair the flexibility of the wall of the completed container. As the trimmed bevelled web advances, a narrower web 54 of the liner material is applied to the uncoated margin, indicated by the bracket B, and for this purpose, the liner web is given a coating of adhesive on the side to be applied to the main web before being placed in contact therewith. The adhesive used for this purpose is oil-impervious, flexible, and gummy or non-brittle, and it retains those characteristics indefinitely. The liner web is so applied to the main web as to project beyond the edge thereof and the surface 55 of the projecting portion of the liner which is opposite to the adhesively coated surface of the main web bears a film of adhesive. The remaining uncoated margin of the main web, indicated by the bracket C, which is narrower than the margin on which the liner has been applied, is then given a coating of a water-proof adhesive, the characteristics of which are similar to those of the adhesive used in securing the liner web in place.

Upon completion of the composite web, it is severed transversely into strips as it moves along with the coated surface of the main web uppermost. Each strip is then further advanced, turned upside down by appropriate mechanism, and delivered to a mandrel with the non-adhesive surface of the liner at the end thereof in contact with the mandrel. The liner is held in this position by suction applied through a row of openings in the mandrel and, when the strip has been properly positioned, the mandrel is rotated to wind the strip thereon. In this operation, the adhesive surface of the projecting portion 55 of the liner comes in contact and overlaps the inner marginal area 56 of the liner and the adhesive area on the margin comes in contact with uncoated portions thereof. The coated area, indicated by the bracket C, secures the under surface of the bevelled edge 52a to an underlying convolution. After the winding operation, the completed body is ejected from the mandrel and the winding operation is then repeated with the next strip.

In the completed body, the adhesive applied to one surface of the liner provides one complete circumferential film of oil-impervious, flexible, gummy material acting as a barrier to prevent the contents of the container from entering between the convolutions forming the wall. Similarly, the film of adhesive securing the bevelled edge 52a in position provides a film which prevents oil from escaping and moisture from entering the wall.

In the new apparatus, the roll 57 of kraft paper is mounted on an arbor 58 rotatable in suitable supports 59 and the arbor is provided with conventional brake devices 60 by which the web 61 is maintained under tension. In order that the web may be properly centered, an adjustment device for positioning the arbor is provided, this device including an arm 62 (Fig. 6) having a bifurcated end entering a channel 63 in the end of the arbor. The arm is moved to shift the arbor endwise by means of a screw 64 threaded into one of the supports 59 and rotatable by a crank 65, the arm being mounted on the screw for free relative rotational movement but held against relative longitudinal movement.

The web 61 is led from the supply roll beneath a roll 66 fast on driven shaft 67 (Fig. 8) mounted in the side frames 68 and thence over another roll 69 on a driven shaft 70 supported in the side frames. The web then passes between upper and lower pairs of knife discs 71, 72, which trim the edges and give the web the precise width desired. The upper discs 71 (Fig. 3) are mounted on a shaft 74 carried in the ends of arms 75 pivoted on stub shafts supported by bar 75a extending between the side frames. The other end of each arm is connected by a rod 76, adjustable in length, to the strap 77 of an eccentric 78 on a shaft 79 (Fig. 8) extending across the machine and provided with crank handles 80. By rotating the eccentrics by means of crank handles, the arm 75 may be swung on their pivots to raise and lower the upper trimming discs 71 relative to the lower discs 72. The discs 72 are mounted on a shaft 81 supported in the side frames in the machine and shafts 74 and 81 are provided with sprocket wheels 82, 83, respectively, driven by chains trained about sprocket wheels 84, 85 on shaft 67 (Fig. 8). An idler sprocket wheel 86 on a stub shaft extending inward from one side frame of the machine guides the chain driving the shaft 74 to keep the chain clear of shaft 70.

The trimmed web passes from the trimming knives over a roll 87 (Fig. 4) fast on a driven shaft 88 mounted in the side frames of the machine. Acting on each edge of the web, as the latter passes over roll 87, is a bevelled grinding disc 89, each disc being mounted on a short shaft 90 (Fig. 5) in an arm 91 fast on a shaft 92 supported in one of the side frames. At its outer end, each shaft 92 carries an arm 93 drawn upwardly by a spring 94 attached to the arm and to a fixed part of the machine, the upper position of the arm being determined by an adjustable stop pin 95 which is mounted in a bracket on the adjacent side frame. Above each arm 93 is an eccentric 96 on a shaft 97 (Fig. 8) extending across the machine and supported in side frames. The shaft 97 is provided with a crank 98 by which it may be rocked to cause the eccentrics to swing the arms 93 and thus cause the grinding discs 89 to be raised and lowered relative to the web.

The shaft of each grinding disc carries a pulley 99 which is driven by a belt 100 (Fig. 8) trained about a pulley 101 on the shaft of a motor 102. The position of the motor is adjustable in order to keep the belt taut and for this purpose, the base of the motor is pivoted on a support 103 (Figs. 1 and 8) and its position on its pivot is determined by a link 104 attached to the base and threaded into the support and secured in position by lock nuts. Disposed inwardly from the bevelling discs are suction chambers 105 (Fig. 4) from which leads a suction pipe 106 through which the material ground from the web is withdrawn.

The trimmed bevelled web next passes beneath a roll 107 fast on a driven shaft 108 mounted in the side frames of the machine and thence over an adhesive-applying roll 109 (Fig. 4) fast on a driven shaft 110 supported in the side frames. The roll 109 serves to apply adhesive over the area indicated by the bracket A (Fig. 32) and the roll is of less length than the width of the web and is spaced inward from the edges thereof. In order to support that portion of the web indicated by the bracket B (Fig. 32), the shaft 110 carries a second roll 111 of appropriate length for the purpose. The roll 109 runs in contact with a roll 112 which is of equal length and fast on the shaft 113 mounted in arms 114 pivoted on the side frames of the machine. The free ends of the arms have openings through which extend pins 115 mounted in suitable brackets on the side frames and carrying adjustable stop nuts against the under surface of which the arms are forced by springs encircling the pins. The roll 112 is thus yieldingly held in contact with roll 109. The surface of roll 112 lies within a body of adhesive in the vessel 116 supported on a bracket 116a secured to the side frames and roll 112 transfers a film of adhesive to roll 109 which in turn applies the adhesive to the web. Shafts 110 and 113 are connected by meshing gears 117, so that the rolls 109 and 112 are rotated in unison.

The web with its adhesive coating next passes beneath and around roll 118 fast on a driven shaft 119 mounted in the side frames. While the main web is in contact with roll 118, the liner web 120 is affixed thereto. The liner web is drawn from a supply roll 120a mounted on an arbor 121 which is suitably supported for rotation on standards 122 and is provided with conventional braking devices 123 to maintain the liner web taut and with means for longitudinal adjustment similar to those associated with arbor 58. The web is led from the supply roll beneath a roll 124 (Fig. 7) on driven shaft 125 mounted for rotation in the side frames of the machine. The web then passes over a roll 126 on a shaft 127 mounted in arms 128 loosely pivoted on shafts 129 mounted in bearings on the side frames (Figs. 9, 10). Each arm 128 has an opening at its free end through which extends a pin 130 mounted in a bracket on the adjacent side frame and provided with adjustable stop nuts against the top of which the arm is forced by a spring encircling the pin. The roll 126 is thus forced yieldingly against a roll 131 (Fig. 3) fast on driven shaft 132 supported for rotation in the side frames. The roll 131 extends into a vessel 133 for adhesive mounted on a bracket 134 on the adjacent side frame and as shaft 132 is driven, it drives shaft 127 through the meshing gears 135 on the shafts. At the same time roll 131 takes up adhesive from the vessel and applies it to the surface of roll 126 which in turn applies it to the surface of the liner web.

The coated liner web passes from roll 126 beneath a roll 136 on a driven shaft 137 (Fig. 7) mounted in arms 138 (Fig. 1) pivotally secured to the side frame members. At their upper ends, the arms have openings through which extend pins 139 secured in brackets on the frame members and carrying stop nuts against which the arms are forced by springs encircling the pins. The roll 136 thus yieldingly presses the liner web against the uncoated margin of the main web passing between rolls 136 and 118 and the webs emerging from between these rolls have been united to form the composite web from which the strips are ready to be cut.

The composite web travels upwardly from rolls 118 and 136 and makes contact with a roll 140 supported for rotation on a shaft mounted in the end pieces 141 of a vessel 142 containing adhesive. The end pieces are fast on one of the shafts 129 (Fig. 10) and in them is mounted the shaft of a roll 143 dipping into adhesive within a vessel 142. The roll 143 transfers adhesive to the roll 140 and for this purpose, the rolls 140 and 143 rotate in surface contact, the shaft of roll 143 being driven by a sprocket wheel 144 connected by a chain to a sprocket wheel 144a on shaft 127 and driving roll 140 by meshing gears 145 on the shafts of the two rolls. To insure application of the adhesive to the web by roll 140, the shaft 129 is provided with an arm 146 on its end outside the side frame in which it is mounted. A pin 147 mounted in a bracket on the side frame extends through the end of the arm and is provided with stop nuts against which the arm is held down by a spring encircling the pin. The spring holds the shaft in such position that roll 140, mounted in the end pieces 141 fast on the shaft, bears yieldingly against the web. The web is kept in contact with roll 140 by means of a bracket 148 (Fig. 7) secured to the adjacent side frame and in position to press the web against the roll. The roll 140 is relatively narrow and applies adhesive only to the narrow margin of the main web indicated by the bracket C in Fig. 32.

Beyond the roll 140, the web passes into contact with a belt 149 trained about drums 150, 151 (Fig. 22) and also about a roll 152. The drum 150 is mounted on a shaft 153 in bearings 154 lying in guide-ways in the side frame members and the position of the bearings may be varied by upper and lower screws 155 to cause the drum to keep the belt taut. The drum 151 is mounted on the shaft 156 supported in bearings in the side frames and roll 152 is mounted on a shaft 157 in similar bearings. Shafts 156 and 157 are provided with sprocket wheels around which are trained a chain 158 which is driven by a sprocket wheel 159 on a shaft 160 mounted in suitable bearings in one side frame and in a standard 161 (Fig. 11). The shaft 160 has a gear 162 meshing with a gear 163 on a shaft 164 mounted in bearings in the standard 161 and driven through a differential mechanism to be described later.

The belt 149 is perforated and the stretch 149a between the drums lies in contact with front wall 165a (Fig. 23) of a suction chamber 165 from which leads a suction pipe 166 (Fig. 11), the wall having grooves from which lead perforations. This chamber has an extension terminating in a perforated wall 167 lying between the surface of the drum 151 and the roll 152. Suction applied to the web through the belt maintains the web in tight contact with the belt as the latter is advanced.

The composite web passes from belt 149 to a knife mechanism by which transverse strips S are severed from it, these strips being later convolutely wound to produce the container bodies. The knife mechanism comprises a pair of side members 168 (Figs. 12, 18) which are secured to a sleeve 169 loose on a driven shaft 170 journaled in the side frames of the machine. The upper ends of the members 168 are slotted to provide guides in which is movably mounted a plate 171 to the lower edge of which is secured a removable knife edge 172 cooperating with a removable knife edge 173 mounted in a crossbar 174 between the members 168. Mounted on the ends of the shaft 170 are eccentrics 175 encircled by straps 176 and links 177 connect lateral extensions from the straps to cranks 178a on a shaft 178 mounted in the side frames of the machine. The shaft is also provided with cranks 178b connected by links 178c to downward extensions 179 from the side members 168. Shaft 170 is provided with a bevel gear 180 meshing with a similar gear 181 on a vertical shaft 182 mounted in brackets 183 extending outwardly from one of the side frames of the machine and shaft 182 is driven from a horizontal shaft 184 suitably journaled in brackets on the machine side frames through bevel gears 185.

The plate 171 is mounted on upward extensions 186 from the straps 176 and the arrangement is such that as shaft 170 rotates eccentrics 175, the side members 168 are rocked about shaft 170 and during their movement, the knife edge 172 is moved toward and away from knife edge 173, the knife edges cooperating to shear strips from the composite web. As the edge of the web passes from the belt 149 to the knife mechanism, the knife edges are separated and as the upper ends of the members 168 swing to the right (Fig. 18), the knife edges are brought together during the movement of members 168, so that the knife edges are moving toward one another and in the direction of movement of the web when the shearing action takes place. While the knife edges are still moving in the direction of the web, they begin to separate and the side members 168 then return to their initial positions. The knife edges do not begin to move toward one another again until the upper ends of the members 168 are again moving with the web.

The severing of a strip from the composite web is not completed until the leading edge of the strip has passed into contact with a plurality of belts 187 trained about a roll 188 and drums 189, 190 mounted on shafts journaled in the machine side frames. The surface of roll 188 is formed with circumferential recesses in which the belts are received and the surface of drums 189 and 190 are similarly recessed, the recesses serving to keep the belts in parallel spaced relation. The belts 187 are perforated and within them is a housing 191 having a grooved and perforated wall 192 in contact with the stretch of the belts between roll 188 and drum 189 and a similar wall 193 in contact with that stretch of the belts between the drums. As illustrated in Figs. 25 and 26, the walls are provided with ribs 194 defining recesses within which the belts lie, and the perforations 195 through the wall lead from the bottoms of the recesses thus defined. A suction pipe 196 leads from one side of the housing and by the suction applied to the strips through the belts and housing walls, the strips are kept in proper position transversely of the belts and at the correct spacing from one another in their advancing movement.

The belts 187 are maintained taut by an idler roll 197 mounted on arms 198 pivoted on brackets on the machine side frames and adjustable in position by screws 199 threaded through the ends of the arms and through brackets on the side frames. The belts are driven by drum 190, the shaft 200 of which is journaled in the side frames and carries a sprocket wheel 201 connected by a chain 202 to a sprocket wheel 203 on shaft 204 journaled in one of the side frames and in a standard 205. The shaft 204 is driven from the horizontal main drive shaft 184 through bevel gearing 207.

Mounted loosely on shaft 204 is the housing 208 of a differential mechanism containing a bevel gear 209 fast on shaft 204. Loosely mounted on shaft 164, which is aligned with shaft 204, is a disc 210 having a circumferential flange in which are journaled bevelled pinions 211 meshing with gear 209 and with a gear 212 fast on shaft 164. On the hub of disc 210 is a worm gear 213 with which meshes a worm 214 mounted on a shaft in brackets attached to standard 161. The shaft of the worm is provided with a sprocket wheel 215 (Fig. 7) connected by a chain 216 to a sprocket wheel 217 on a shaft mounted in a bracket 218 extending outwardly from one of the side frames. The shaft of sprocket wheel 217 carries a hand crank 219 and by operation of this crank, the shaft 164 may be rotated.

Shaft 164 is provided with a sprocket wheel 220 connected by a chain to a sprocket wheel 221 (Fig. 2) on shaft 222 journaled in the side frames of the machine. Shaft 222 drives longitudinal shaft 223 through bevelled gears, shaft 223 being mounted in suitable brackets on one of the side frames. Shaft 223 drives shaft 110 of roll 109 through suitable bevel gears and also drives shaft 113 of roll 112 through meshing gears 117. Shaft 223 drives shaft 119 of roll 118 through suitable bevel gearing and shaft 119 drives shaft 137 of roll 136 through meshing gears 224. Shaft 223 drives shaft 132 through bevel gearing, and shaft 132 drives shaft 127 through meshing gears 135. Shaft 223 also drives shaft 125 of roll 124.

One end of shaft 222 lying outside the side frame of the machine drives vertical shaft 225 through bevel gearing, and shaft 225 is mounted for rotation in suitable brackets and is connected through bevel gearing to shaft 108 of roll 107. Shaft 108 is connected by bevel gearing to drive shaft 226 which drives shaft 88 of roll 87, shaft 70 of roll 69, and shaft 67 of roll 66. Shaft 184 acts through suitable bevel gearing to drive shaft 182 which in turn acts through bevel gears 181 and 180 to drive shaft 170 carrying eccentrics 175 by which the knife mechanism is actuated.

The web employed for making the container bodies frequently bears a succession of labels printed thereon and the strips must be accurately severed so that each strip carries a single label. Accordingly, it is necessary to provide means by which the position of the composite web relative to the knife mechanism may be adjusted, and the differential mechanism between shafts 164 and 204 serves this purpose.

As has been described, the belt 149 and the web preparing mechanism in advance of that belt is driven from shaft 164 while belts 187 are driven from shaft 204. Shaft 164 may be rotated manually by rotation of the disc 210 carrying the pinions 11 and this rotation is effected by means of crank 219 which rotates worm 214 driving gear 213 fast on the hub of disc 210. By proper rotation of disc 210, drum 151 and roll 152 engaging belt 149 may be rotated forward or backward and all of the rolls of the web preparing mechanism may similarly be rotated.

The strips S (Fig. 22) severed from the composite web by the cutting mechanism are carried away by belts 187 with intervals between successive strips resulting from belts 187 traveling at a higher speed than belt 149. The presence of these intervals facilitates removal of the strips from belts 187 and the transfer of the strips to the mandrels.

The machine illustrated is provided with six mandrels operated in unison and six strips are removed simultaneously from belts 187 and transferred to the mandrels. The removal of the strips is effected by similar devices, disposed one above another, and each device includes a plurality of fingers 227 (Figs. 13, 18, 22) mounted side by side on a shaft 227a journaled in suitable brackets on the machine frame. Mounted on each shaft adjacent each finger is a roller 228 around which is trained a perforated belt 229, the end of the finger being offset to overlie the belt, and the belt also passes about rollers 230 on stub shafts 231 and similar rollers 232 on a shaft 233. At the end of the group of belts is a bracket 229a for supporting the end of the strip. The rollers are arranged in groups of three in triangular formation (Fig. 22) and lie between side plates 234. Each pair of plates with its belt defines a housing connected by a suction pipe 235 leading to a main suction duct 236. The fingers 227 and belts 229 lie in alignment with the spaces (Fig. 13) between the belts 187 on drums 189 and 190, and the fingers may be moved to a position in which their free ends enter the spaces referred to. When the fingers are in that position, a strip S carried along by belts 187 is removed from belts 187 by the fingers and is then picked up and carried along by belts 229. In order to insure that the leading edge of each strip will move along the fingers in contact therewith, an air pressure pipe 237 is mounted to extend along each row of fingers, the several pipes 237 being supplied with air under pressure from a pipe 238 (Fig. 13).

The lowermost shaft 227a carries a bell crank lever 239, one arm of which is connected by a rod 240 to crank arms 241 on the remaining shafts 227a. The other arm of bell crank lever 239 is connected by a link 242 to one end of a bell crank lever 243 pivotally mounted on a suitable part of the machine. One arm of the bell crank lever carries a cam follower roller 244 running on the surface of a cam disc 245 on shaft 246 journaled in brackets 247 extending from a suitable standard, and shaft 246 also carries a second cam 248 on which runs cam follower roller 249 mounted in the other arm of the bell crank lever 243. Shaft 246 is driven through bevel gearing 250 from shaft 251 on which is mounted a gear 252 driven by a pinion 253 on shaft 254. Shaft 254 extends into gear box 255, the driving shaft 256 of which carries a pulley 257 driven by a belt 258 running on a pulley 259 on the shaft of motor 260.

The formation of cams 245 and 248 is such that during the operation of the machine, the strips S are carried down in spaced relation along the vertical stretch of belts 187 and, at the appropriate instants, the ends of the fingers 227 are moved inward. The movement of the fingers is so timed that each group moves into position in front of the leading edge of one of the strips, and the strips are thus removed from belts 187 and picked up and carried along by belts 229, being held thereon in part by air pressure from the nozzle pipe 237 and in part by suction applied through belts 229.

The shafts 233 carrying rollers, about which belts 229 are trained, are driven through bevel gearing 261 from a vertical shaft 262 which is driven through bevel gearing by a shaft 263 in turn driven through bevel gearing from shaft 184. Shaft 184 carries a gear 264 meshing with a similar gear 265 on shaft 266 driven from gear box 255.

The strips travel along the inclined stretch of belts 229 in such position that the upper surface of each strip includes the area covered by the liner material 54 with the remainder of the surface coated with adhesive. To effect the winding, each strip is first applied to a mandrel, with the liner contacting with the mandrel surface. Transfer means are accordingly provided for removing each strip from its set of belts 229, turning the strip upside down, and applying it to the mandrel in the manner described.

Each of the transfer means for a single strip includes a plurality of hollow arms 267 (Fig. 29) attached at one end to a hollow shaft 268 connected through ports 269 to the interior of each arm. Each of the arms has a flat surface 270 provided with a plurality of perforations and its shaft extends through a suction box 271 and has ports 272 through which the interiors of the shaft and arms are connected to the interior of the suction box 271. The several suction boxes are connected by a duct 273 which is in turn connected by duct 274 to the intake side of a blower. Beyond the suction box, shaft 268 passes through a bearing in a suitable frame member 275 and is connected by bevel gearing to a vertical shaft 276.

Shaft 276 is driven through bevel gearing by a horizontal shaft 277 which carries a gear 278 meshing with another gear 279 on a shaft 280, shafts 277 and 280 being journaled in suitable bearings in frame members of the machine. Gear 279 meshes with a gear 281 (Figs. 2, 15) fast on a shaft 282 carrying a slotted disc 283 which is driven by pins in the ends of the double crank 284 on a shaft 285, the crank pins and slotted disc forming a Geneva mechanism which includes quadrant plates 284a cooperating with disc 283 to provide a lock. The shaft 285 is journaled in suitable standards and it carries a gear 286 meshing with a gear 287 on shaft 251, which is driven by gear 252 thereon meshing with gear 253 on shaft 254 entering gear box 255.

Since the drive for the groups of arms 267 includes a Geneva mechanism, the arms remain stationary for a part of their cycle of operations and are then moved through a path in which each set of arms picks up a strip from belts 229 and carries the strip to a position in which it lies with its liner and adhesive coating on its undersurface. In that position, the liner is in contact with a mandrel and the arms then remain stationary during the winding operation. To insure that the arms will not be moved while the winding is going on, each group of arms is provided with a locking mechanism.

The lock referred to includes a plurality of plates 288 on a rotating vertical shaft 289 (Figs. 2, 18). Each of the plates rotates in a plane slightly above the upper surface of the end arm of one set, when the arm is in the position shown in Fig. 22. The arm is provided with an overhanging lug 290 on the surface referred to and when the plates 288 are in locking position, the lugs 290 overlie their peripheries and the arms of each set are thus prevented from moving down. The plates 288 are of such shape that during their rotation, they permit free movement of the arms 267 at the proper instants. The movement of the plates and shaft 289, on which they are mounted, is effected by means of bevel gearing connecting shaft 289 and shaft 246, the latter shaft being driven by shaft 251 which rotates continuously. When the arms 267 are in their position of rest, each strip S carried thereby lies with the projecting edge of its liner in contact with the upper surface of a mandrel 291 (Figs. 14, 19). Each mandrel (Fig. 21) is hollow and it is provided with a row of perforations lying in a line. The mandrels are mounted for rotation in suitable uprights 292 and each mandrel is driven through bevel gearing 293 from a vertical shaft 294. At one end, each mandrel extends into a stuffing box 295 supported by a bracket on standard 292, and a suction pipe 296 leads from the stuffing box. Suction applied to the strip through the row of perforations in the mandrel holds the strip in position during the winding.

In the winding operation, the mandrels are rotated by rotation of shaft 294 which is driven by bevel gearing from a shaft 297 carrying a pinion 298 meshing with a gear 299 on shaft 300. This shaft also carries a slotted disc 301 driven by pins in a double crank 302 on shaft 285, the double crank and slotted disc forming a Geneva mechanism which includes quadrant plates 302a cooperating with disc 301 to provide a lock. The drive for the mandrels is such that, starting from a position of rest with the row of perforations in each mandrel uppermost, the mandrels rotate a sufficient number of times to wind up the strips applied thereto. During the winding operation, a high degree of suction is applied to the mandrels through the pipes 296 which lead to a pipe 303 containing a valve 304, the stem of which is connected to a lever 305 pivoted on a suitable upright and carrying a roller 306 held in engagement with a cam 307 on shaft 285 by a spring 308 encircling the stem of valve 304 (Fig. 16). The operation of the valve is so timed that the high vacuum is applied to the mandrels during the winding operation and is then cut off during the stripping operation and until the next strips are about to be applied to the mandrels.

The strips being wound are also held tightly against the mandrels by rolls 309, one for each mandrel, each roll being mounted for rotation in an arm 310 (Fig. 14) having a roll 311 running on the surface of a bracket 312 attached to a suitable standard. Each arm 310 is connected to one arm of a bell crank 313 pivoted on the standard and the other arm of the bell crank is connected to a rod 314 vertically reciprocated by means of a bell crank 315 (Fig. 16) mounted in a bracket on a suitable standard and actuated by a link 316 connected to one end of a lever 317 pivoted on a suitable standard and having a roller 318 running on the surface of a cam disc 319 on shaft 251. The shaft carries another cam disc 320 against which runs a roller 321 carried by a lever 322 pivoted on the same standard as lever 317 and connected thereto by a link 323. As shaft 251 rotates, the levers 317, 322 are swung by the cams 319, 320 and act through the connections described to move the rollers 309 to a position in which each roller 309 holds one end of a strip in contact with the mandrel on which it is to be wound.

Upon completion of the winding operation, the wound container bodies are stripped from the mandrels and delivered to a conveyor chain by which they are transferred to a delivery point. The stripping mechanism includes a rod 324 for each mandrel, the rod having an offset end 325 shaped to encircle the mandrel almost completely. The rod is mounted in suitable guides on an upright and at its rear end, it is provided with a rack 326 engaged by a quadrant gear 327. The quadrant gears 327 for the several strippers are mounted on a rock shaft 328 journaled in suitable brackets on one of the machine uprights and driven through bevel gearing from a shaft 329 supported in suitable bearings in uprights. Shaft 329 carries a crank 330 actuated by a link 331 (Figs. 17, 20) which is attached to one end of a bell crank 332 pivoted on an upright and provided at its other end with a roll 333 running on the surface of cam disc 334 on shaft 251.

The cam disc 334 is so shaped that during a winding operation, each stripper is in retracted position and when each mandrel is at rest after the operation is completed, the stripper is advanced to force the wound container body off the mandrel whence it falls upon the inclined portions of the fingers 335 mounted on suitable brackets on the machine frame (Fig. 28). The body rolls down the inclined portions of the fingers until it reaches a position where it is supported by a horizontal portion of one finger and by curved lags 336 on chains 337 trained about gears 338 on upper and lower shafts 339, 340, respectively, the shafts being mounted in suitable journals. As initially deposited on the fingers 335, each container body may not be sufficiently far removed from the end of the mandrel on which it is wound to permit it to be carried away freely by the conveyor chains and means are, therefore, provided to advance each container body axially to a position in which it is entirely free of its mandrel.

The advancing means referred to includes a crank 341 disposed adjacent and below the free end of each mandrel, this crank being mounted on a suitable bracket actuated by a link 342 attached to one end of a bell crank 343, the other end of which carries a cam roller 344 bearing against the surface of a cam 345 attached to the underside of the stripper by which the container body is removed from the mandrel. A spring 346, attached to the bell crank, maintains the cam roller in contact with the surface of the cam and the cam is so designed that when the stripper advances to force the container body from the mandrel, the crank 341 is actuated to strike the stripped body after it is being supported by the horizontal portion of one finger 335 and the lags 336. The crank advances the body against a stop 347 in which position the body is properly centered with reference to the lags. The conveyor chains are driven by shaft 339, which is driven through gearing by shaft 348 journaled in suitable brackets 349 and carries a sprocket wheel 350 on which runs a chain 351 driven by a sprocket wheel 352 on shaft 297. The bodies picked up by lags 336 are elevated and carried over the sprocket wheels 338, where they fall from the lags onto a chute 353.

The method and apparatus of the invention makes possible the production of container bodies in a continuous operation and at a high output rate. In the apparatus illustrated, these bodies are formed of a composite strip in which one material is employed as a liner and another material forms the main laminations of the body. Also, adhesives of different types are employed for affixing the liner to the main lamination material and for securing together the main laminations. It will be understood, however, that the principles of the invention may be utilized advantageously in the production of container bodies made of a single material and with a single type of adhesive. Also, by suitable adjustments and minor changes, container bodies of varying dimensions may be produced as desired.

I claim:

1. A method of making container bodies, which comprises advancing a main web of indefinite length in an endwise direction, and, during its advance, applying adhesive to one face thereof, affixing along one edge to extend therebeyond a narrower web, the projecting portion of which has an adhesive coating on the surface thereof opposite to that coated on the main web, and severing transverse strips from the composite web with the width of the strips extending lengthwise of the web, advancing the strips in the direction of their width from the station where they were severed from the web to a winding station and during such movement, turning the strips upside down, and at the winding station, winding each strip convolutely in the direction of its length with the portion of the narrower web forming the inner convolution.

2. A method of making container bodies, which comprises applying adhesive to the upper surface of a main web of indefinite length, affixing to said surface along one edge to project beyond the edge a narrower web of indefinite length, the under surface of the projecting portion of the narrower web being adhesively coated, severing the composite web into transverse strips with the width of the strips extending lengthwise of the web, advancing the strips in the direction of their width from the station where they were severed from the web to a winding station and during such movement, turning each strip upside down, applying the non-adhesive surface of the portion of the narrower web of the strip to a mandrel at the winding station, and rotating the mandrel to wind the strip convolutely in the direction of its length.

3. A method of making container bodies, which comprises applying adhesive to one face of a main web of indefinite length to coat an area terminating inward from the edges thereof, applying a different adhesive to one surface of a narrower web of a different material, affixing the narrower web to the main web to cover one of the uncoated margins thereof and to project beyond the adjacent edge, applying an adhesive of a third kind to the other uncoated margin of the main web, severing transverse strips from the composite web with the width of the strips extending lengthwise of the web, advancing the strips in the direction of their width from the station where they were severed from the web to a winding station and at the winding station, winding each strip convolutely in the direction of its length and with the portion of the narrower web forming the inner convolution, the portion of the narrower web projecting beyond the main web overlapping and being secured to said narrower web during the winding operation.

4. A method of making container bodies which comprises applying adhesive to one face of a fibrous web, affixing a liner to said face along one edge, advancing the composite web with the liner and adhesive coated surface uppermost, severing transverse strips from the composite web with the width of the strips extending lengthwise of the web, advancing the strips in the direction of their width from the station where they were severed from the composite web to a winding station and during such movement, turning the strips to place the liners underneath, applying each strip to the surface of a mandrel at the winding station, with the liner in contact with the mandrel, and rotating the mandrel to wind the strip convolutely in the direction of its length.

5. A method of making container bodies which comprises severing transverse strips from a web, advancing the strips in spaced relation along the same path, simultaneously applying a plurality of the strips to respective mandrels, and simultaneously rotating the mandrels to wind the strips to form cylindrical bodies.

6. A method of making container bodies which comprises severing transverse strips from a web, advancing the strips along the same path, applying a plurality of the strips simultaneously to respective mandrels, and simultaneously rotating the mandrels to wind the strips to form cylindrical bodies.

7. A method of making container bodies which comprises severing transverse strips in successive operations from a web, advancing the strips along a single path in a plane from the point at which the severing operation occurred, simultaneously transferring a plurality of the strips from the plane of advance and turning the strips to lie in parallel planes in contact with respective mandrels, and simultaneously rotating the mandrels to wind the strips to cylindrical form.

8. A method of making container bodies which comprises severing transverse strips from a web, advancing the strips along the same path, applying a plurality of the strips simultaneously to respective mandrels, simultaneously rotating the mandrels to wind the strips to cylindrical form, and simultaneously stripping the wound strips from the mandrels.

9. A method of making container bodies which comprises severing transverse strips from a web, advancing the strips, applying a plurality of the strips simultaneously to respective mandrels, simultaneously rotating the mandrels to wind the strips to cylindrical form, simultaneously stripping the wound strips from the mandrels and depositing them on individual supports, simultaneously positioning the wound strips on their supports, and removing the wound strips from the supports and delivering them to a selected point.

10. Apparatus for making container bodies, which comprises means for severing transverse strips from a web, means for advancing the strips, means for removing the strips from their advancing means and transporting them to winding means, and means for operating the winding means to wind the strips to cylindrical form.

11. Apparatus for making container bodies, which comprises means for advancing a web, means for severing transverse strips from the web, means for advancing the strips, means for removing a plurality of strips simultaneously from their advancing means and delivering them to winding means, and means for operating the winding means to wind said plurality of strips simultaneously to cylindrical form.

12. Apparatus for making container bodies, which comprises means for advancing a web, means for severing transverse strips from the web, means for advancing the strips, means for removing the strips from their advancing means and delivering them to winding means including a mandrel, and means for holding a strip upon the mandrel and rotating the mandrel to wind the strip to cylindrical form.

13. Apparatus for making container bodies which comprises means for advancing a web, means for severing transverse strips from the web, means for winding the strips to cylindrical form, means for advancing the strips from the severing means toward the winding means, and means for picking up the advancing strips and transporting them to the winding means.

14. Apparatus for making container bodies which comprises means for advancing a web, means for severing transverse strips from the web, means for winding the strips to cylindrical form, means for advancing the strips from the severing means toward the winding means, and means for transporting the strips from the advancing means to the winding means and turning the strips upside down during their transportation.

15. Apparatus for making container bodies which comprises means for advancing a web, means for severing transverse strips from the web, means for winding the strips to cylindrical form, means for transferring the strips from the severing means to the winding means, means for removing the wound strips from the winding means, and means for operating the winding and removing means intermittently and alternately.

16. Apparatus for making container bodies which comprises means for advancing a web, means for severing transverse strips from the web, means for winding a plurality of the strips simultaneously to cylindrical form, means for advancing the strips from the severing means in a series, and means for simultaneously transferring a group of strips from the strip-advancing means to the winding means.

17. Apparatus for making container bodies which comprises means for advancing a web having adhesive on one face thereof with the coated face uppermost, means for severing transverse strips from the web, means for advancing the strips with their coated faces uppermost, means for winding the strips to cylindrical form, means for removing the strips from the strip-advancing means, and means for transporting the strips from the removing means to the winding means and turning the strips upside down during such transportation.

18. Apparatus for making container bodies which comprises means for advancing a web having adhesive on one face thereof with the coated face uppermost, means for severing transverse strips from the web, means for advancing the strips with their coated faces uppermost, means for winding the strips to cylindrical form, and means involving the use of differential air pressures for transferring the strips from the strip-advancing means to the winding means.

19. In apparatus for making container bodies, the combination of traveling suction means for advancing a web, means for severing transverse strips from the web with the width of the strips lying lengthwise of the web, traveling suction means for advancing the strips in the direction of their width, means for winding the strips in the direction of their length to cylindrical form, and means for transporting the strips from the strip-advancing means to the winding means.

20. In apparatus for making container bodies, the combination of traveling suction means for advancing a web, means for severing transverse strips from the web, traveling differential air pressure means for advancing the strips, means for winding the strips to cylindrical form, and suction means for transporting the strips from the strip-advancing means to the winding means.

21. In apparatus for making container bodies, the combination of means for winding a strip to cylindrical form, means for removing the wound strip from the winding means and delivering it to a receiver, means for altering the position of the delivered wound strip with relation to the receiver, and means for removing the wound strip from the receiver.

22. Apparatus for making container bodies which comprises means for advancing a main web in the direction of its length, means for trimming the edges of the main web, means for beveling the main web along its edges, means for applying an adhesive coating to one face of the main web except along one edge, means for affixing a liner web to the uncoated portion of said face of the main web, means for severing long relatively narrow transverse strips from the composite web, means for advancing the strips in their plane and in the direction of their width, means for winding the strips in the direction of their length to cylindrical form, means for transferring the strips by moving them in the direction of their width from the strip-advancing means to the winding means, and means for discharging the wound strips from the winding means.

23. A method of making container bodies which comprises severing long relatively narrow body blanks transversely from a web, simultaneously advancing a plurality of the severed blanks in the direction of their width and in spaced relation along the same path, and winding the blanks in the direction of their length to form cylindrical bodies.

24. Apparatus for making container bodies which comprises means for advancing a web, means for severing relatively narrow body blanks transversely from the leading end of the web, means for simultaneously advancing a plurality of the blanks in the direction of their width and in spaced relation, and winding means for winding the blanks convolutely in the direction of their length.

25. Apparatus for making container bodies which comprises means for severing long relatively narrow strips from a web, means for advancing the strips in the direction of their width and for applying differential air pressures on opposite faces of the strips to hold them in place during their advance, means for transporting the strips from the advancing means to a winding station, said transporting means applying differential air pressures to opposite faces of the strips during their transportation, and means at the winding station including a mandrel for winding the strips convolutely in the direction of their length.

26. A method of making container bodies which comprises advancing a web of indefinite length and during its advance, severing body blanks transversely from the web at the leading end thereof, and simultaneously advancing a plurality of the blanks to winding stations, and at said stations, winding said blanks on an axis parallel to the direction of movement of said web.

27. A method of making container bodies which comprises continuously advancing a web from a supply, severing body blanks transversely from the leading end of the web, simultaneously advancing a plurality of said blanks in the direction of advance of the web to winding stations, and at said stations, winding the blanks convolutely about an axis parallel to the direction of advance of the web.

28. Apparatus for making container bodies which comprises means for severing relatively narrow body blanks transversely from a web, means for simultaneously advancing a plurality of the blanks in the direction of their width and in spaced relation, means for removing the blanks from the advancing means and transporting them to winding stations, and means at said stations for winding the blanks convolutely in the direction of their length.

29. A method of making container bodies which comprises advancing a main web of indefinite length in the direction of its length, while the web is advancing, applying adhesive to one surface thereof, affixing to said surface along one edge thereof a narrower web of a different material, the narrower web projecting beyond said edge and the projecting area being adhesively coated on the surface opposite to that coated on the main web, severing transverse strips from the composite web, the width of the strips extending lengthwise of the web, and simultaneously advancing a plurality of strips in spaced relation and in the direction of their width from the severing station to winding stations, and at said winding stations, winding the strips in the direction of their length to cylindrical form.

30. A method of making container bodies which comprises advancing a web of indefinite length in the direction of its length, while the web is advancing, applying adhesive to one surface thereof, affixing to said surface along one edge thereof a narrower web of a different material, the narrower web projecting beyond said edge and the projecting area being adhesively coated on the surface opposite to that coated on the main web, severing transverse strips from the composite web, the width of the strips lying lengthwise of the web, and simultaneously advancing a plurality of the strips in spaced relation and in the direction of their width from the severing station to winding stations, and at the winding stations, winding the strips convolutely in the direction of their length with the portion of the narrower web forming the inner convolution in the winding.

31. A method of making container bodies which comprises advancing a main web of indefinite length in the direction of its length, while the web is advancing, applying adhesive to one surface thereof, affixing to said surface along one edge thereof a narrower web of a different material, the narrower web projecting beyond said edge and the projecting area being adhesively coated on the surface opposite to that coated on the main web, severing transverse strips from the composite web, the width of the strips lying lengthwise of the web, and simultaneously advancing a plurality of the strips in the direction of their width and in spaced relation from the severing station to mandrels, applying each strip to a mandrel with the non-adhesive surface of the narrower web in contact therewith, and rotating the mandrel to wind the strip in cylindrical form.

32. A method of making container bodies which comprises advancing a web of indefinite length in the direction of its length, while the web is advancing, applying adhesive to one surface thereof, affixing to said surface along one edge thereof a narrower web of a different material, the narrower web projecting beyond said edge and the projecting area being adhesively coated on the surface opposite to that coated on the main web, severing transverse strips from the composite web with the width of the strips lying lengthwise of the web, and simultaneously advancing a plurality of the strips in spaced relation and in the direction of their width from the severing station to mandrels, each having a circumference less than the length of the portion of the narrower web on the strip, applying each strip to a mandrel with the non-adhesive surface of the narrower web in contact with a mandrel, and rotating the mandrel to wind the strip convolutely in the direction of its length.

33. A method of making container bodies which comprises advancing a main web of indefinite length in an endwise direction and, during its advance, applying adhesive to one face thereof, affixing along one edge to extend therebeyond a narrower web, the projecting portion of which has an adhesive coating on the surface thereof opposite to that coated on the main web, severing transverse strips from the composite web with the width of the strips extending lengthwise of the web, simultaneously advancing a plurality of the strips in spaced relation and in the direction of their width from the severing station to winding stations, and at the winding stations, winding the strips in the direction of their length to cylindrical form.

34. A method of making container bodies which comprises beveling the lateral edges of a main web of indefinite length, applying adhesive to one face of the web, affixing to said face along one edge to project therebeyond a narrower web, the projecting portion of the narrow web having a coating of adhesive on the face adjacent the main web, severing transverse strips from the composite web, with the width of the strips extending lengthwise of the web, simultaneously advancing a plurality of the strips in the direction of their width and in spaced relation from the severing station to winding stations, and at the winding stations, winding the strips convolutely in the direction of their length with the narrower web portions forming the inner convolutions, the diameter of the convolutely wound bodies being such that the beveled end edges of each main web portion lie in registry.

35. A method of making a container body which comprises forming a long relatively narrow strip of flexible fibrous stock having a full-width area at one end covered by a layer of a different material adhesively held in position, the layer projecting beyond said end and the projecting portion lying in a plane and having an adhesive coating on its under surface, advancing the strip in the direction of its width from the forming station into engagement with a mandrel at a winding station, and, at the winding station, winding the strip convolutely about the mandrel in the direction of the length of the strip with the layer forming an inner convolution having a circumference less than the length of the layer, the projecting portion of the layer overlapping and being secured to the other end of the layer in the winding operation.

FREDERICK L. BRONSON.